(12) United States Patent
Sauer

(10) Patent No.: US 7,048,777 B2
(45) Date of Patent: May 23, 2006

(54) METHOD AND APPARATUS FOR REMOVING WAXY MATERIALS FROM A GAS STREAM

(75) Inventor: Richard A. Sauer, Hinsdale, IL (US)

(73) Assignee: Air Liquide America, L.P., Houston, TX (US)

( * ) Notice: Subject to any disclaimer, the term of this patent is extended or adjusted under 35 U.S.C. 154(b) by 0 days.

(21) Appl. No.: 10/750,776

(22) Filed: Dec. 31, 2003

(65) Prior Publication Data
US 2004/0244588 A1 Dec. 9, 2004

Related U.S. Application Data

(60) Provisional application No. 60/477,146, filed on Jun. 9, 2003.

(51) Int. Cl.
B01D 53/00 (2006.01)
F25J 3/08 (2006.01)
(52) U.S. Cl. .............. 95/14; 95/19; 95/290; 62/85; 62/617
(58) Field of Classification Search .......... 95/14, 95/19, 288, 290; 62/601, 606, 617, 532, 62/85; 55/DIG. 15
See application file for complete search history.

(56) References Cited

U.S. PATENT DOCUMENTS

| | | | | |
|---|---|---|---|---|
| 1,842,263 A | * | 1/1932 | Gobert | 62/638 |
| 4,191,022 A | * | 3/1980 | Williams | 62/55.5 |
| 4,239,511 A | * | 12/1980 | Austermuhle | 95/199 |
| 4,391,617 A | * | 7/1983 | Way | 95/290 |
| 4,479,927 A | * | 10/1984 | Gelernt | 423/481 |
| 4,773,923 A | * | 9/1988 | Scharf | 62/637 |
| 5,340,383 A | * | 8/1994 | Womack | 95/243 |
| 5,820,641 A | * | 10/1998 | Gu et al. | 55/434.4 |
| 6,206,971 B1 | * | 3/2001 | Umotoy et al. | 118/715 |
| 6,258,153 B1 | * | 7/2001 | Hintermaier | 95/267 |
| 6,488,745 B1 | * | 12/2002 | Gu | 95/272 |

FOREIGN PATENT DOCUMENTS

JP 02-228405 * 9/1990

OTHER PUBLICATIONS

"Wax", Hawley's Condensed Chemical Dictionary, 14th Edition, John Wiley & Sons, Inc. 2002.*

* cited by examiner

Primary Examiner—Frank M. Lawrence
(74) Attorney, Agent, or Firm—Elwood L. Haynes; Linda K. Russell

(57) ABSTRACT

The invention uses both heating and cooling zones to prevent the precipitation of solids onto equipment surfaces until they are efficiently removed from the gas phase via one or more heat exchangers. Each heat exchanger may be regenerated to melt off the solids when the amount collected becomes excessive. A storage plenum is available under each heat exchanger to store the melted solids until final removal to avoid the need to open the equipment for the removal of the unwanted solids.

9 Claims, 3 Drawing Sheets

METHOD AND APPARATUS FOR REMOVING WAXY MATERIALS FROM A GAS STREAM

CROSS REFERENCE TO RELATED APPLICATIONS

This application claims the benefit of U.S. Provisional Application No. 60/477,146, filed Jun. 9, 2003, the entire contents of which are incorporated herein by reference.

BACKGROUND OF THE INVENTION

1. Field of the Invention

This invention relates to the removal of impurities from a fluid stream. Particularly, this invention relates to the removal of solid substances from a gas stream. More particularly, this invention is related to the removal of wax from a gas stream.

2. Description of the Related Art

Various techniques have been developed for removal of undesirable substances from a gas stream. As illustrated in FIG. 1, one approach uses two wax traps in series to remove the wax that solidifies from the gas stream. The traps include a bed of solid, extended surface, fluid contact phase change devices, typically Rashing rings, Intalox saddles, Pall rings, Berl saddles, Lessing rings, and other commercially available devices. These phase change devices are typically poured into a wire basket that is then inserted within a pressure vessel. The pressure vessel is then cooled with chilled water re-circulating through a water jacket. Typically, the wax-containing feed stock piping, any interconnecting piping, and the pressure vessels themselves were unheated and un-insulated.

As shown in FIG. 1, the fact that the wax-containing feed stock pathway is unheated and un-insulated allows most of the wax (represented by the arrows) to precipitate on the cooler surfaces of the piping and the traps. Despite this unwanted inner surface precipitation, and even after having passed through the zone containing the phase change devices, a significant amount of wax-containing residue breaks through the system. Typically, no provisions are made to cycle the traps, as they are usually not arranged in redundant, parallel trains. Likewise, typically no provisions are made to clean these traps in-situ, heat/insulate the piping surfaces, improve wax removal efficiency, or prevent solids deposition on vessel or piping internals.

The above systems experience three main problems. The traps, including phase change devices and basket, need to be disassembled and cleaned often, in order to remove the solids which have precipitated on them. In many cases these cleanings are required daily. The entire wax remediation unit must also be disassembled and cleaned weekly to remove precipitated solids from the internals of the piping and trap vessels. Lastly, the traps themselves are reasonably inefficient, because they allow enough waxy solids downstream to cause problems with downstream components, such as vacuum pumps or other gas handling equipment.

Another approach as illustrated in FIG. 2, removes gaseous VOC's from a process waste stream via a cryo-condensation based process. Typically, the VOC-laden stream is fed to two, or more, heat exchangers, typically in parallel, to cool the process gas stream using a cryogenic fluid. These systems are designed to condense the various VOC's, and not to freeze them onto a target surface. Inevitably, some undesired freezing will occur. Thus, while one heat exchanger is being used to cool the VOC-laden stream, heat may optionally be used to melt off any water ice or VOC's from the cold surfaces of other heat exchangers. The resultant condensed liquid VOC material is then typically drained away from the heat exchanger via gravity and held in a storage vessel to be pumped out. Remaining clean waste gas exits the system. Examples of such systems are the SOLVAL VOC Removal and Recovery System marketed by Air Liquide America, LP, and the Kryoclean VOC Control System marketed by BOC.

A VOC is defined by the Federal Government as a photochemically reactive chemical that contains carbon. 40 C.F.R. 51.100 (s). This is a broad definition, and there is no common agreement among the various states as to what constitutes the complete list of VOC's. It is generally agreed that VOC's tend to be fairly light molecules, generally ranging from around propane (MW 44.1) to around C15 Alkenes (MW 210.4). There are some VOC's with higher molecular weights, such as Branched C18 Alkanes (MW 254.5), but most tend to be fairly light.

Another generally agreed common trait is that most VOC's tend to be in liquid phase at ordinary ambient temperatures. It is well known to those of ordinary skill in the art, that for organic compounds in the same class, both the boiling point and the freezing point increase with carbon number, and thus molecular weight. Variances in class (i.e. aromatic, napthene, isoparrafin, etc.) also effect boiling point and freezing point.

The present invention is useful for removing molecules that tend to be heavier than most VOC's, in particular hydrocarbon molecules with carbon numbers of C12 and larger. Hydrocarbon molecules with carbon numbers of C12 and higher, and more particularly those with carbon numbers of C15 and higher, tend to be solid at ordinary ambient temperatures. These higher carbon number molecules also tend to be waxy in nature, and herein the term 'wax' or 'waxy' will be used synonymously with these higher carbon number molecules.

The present invention uses a freezing mechanism to capture and collect such solid pollutants, and subsequent heating to greater than ambient temperature is used to melt off the accumulated wax. In addition, the front end piping and wax storage capacity may be heated and insulated in the invention to prevent solids precipitation in unwanted areas and to facilitate removal of the previously melted wax via draining.

Other types of cryogenic or non-cryogenic (Thermal Oxidizer, Carbon Adsorption, Water spray towers, etc.) systems for VOC abatement are also commercially available from industrial companies. Many of these systems use catalysts or solvents to aid in the removal of the hydrocarbon impurities. The present invention introduces no new substances that may potentially act to contaminate the fluid stream.

The prior art systems are good at condensing VOC's, and removing them from the stream in liquid form. However, these systems are not used for removal of substances existing as solids at room temperature. Therefore, a need exists within the industry for a system that can be used to remove higher molecular weight compounds, particularly those that are solid at ordinary ambient temperatures, from a fluid stream. In particular, a need exists within the industry for a system that can be used to remove vaporized or suspended higher carbon number components that tend to be solid at ordinary ambient temperatures, from a gas phase stream.

VARIOUS EMBODIMENTS OF THE INVENTION

In one aspect of the present invention, a method of separation is provided. The method of separation of the present invention includes introducing an impurity-containing fluid stream into a heating zone. This heating zone is then elevated to a first temperature, wherein substantially all impurities present in said impurity-containing fluid stream are prevented from undergoing a phase change, and remain in the vapor phase. The impurity-containing fluid stream is then introduced into a cooling zone, which is reduced to a second temperature. In this second cooling zone, substantially all impurities present in said impurity-containing fluid stream have undergone a first phase change.

In another aspect of the present invention, a method of separating wax from a wax-containing feedstock is provided. The method of separation includes introducing a wax-containing gas stream into a heating zone, which contains a first heat exchanger. This heating zone is then elevated to a first temperature, wherein substantially all of the wax present in said wax-containing gas stream is prevented from undergoing a phase change, and remains in the vapor phase. The wax-containing gas stream is then introduced into a cooling zone, which contains a second heat exchanger, and which is reduced to a second temperature. In this cooling zone, substantially all of the wax present in said wax-containing gas stream is solidified onto the surface of this second heat exchanger.

In yet another aspect of the present invention a method for separating wax from a waxy gas stream is provided. The method of separating includes introducing a wax-containing gas stream into a system comprising at least a first heating zone (containing a first heat exchanger), a second heating zone (containing a second heat exchanger), a first cooling zone (containing a third heat exchanger), and a second cooling zone (containing a fourth heat exchanger). The first heating zone and first cooling zone constitute one complete separation train, while the second heating zone and the second cooling zone constitute a second complete separation train. The wax-containing gas stream is introduced into the heating zone of the first train, which is elevated to a first temperature, wherein substantially all of the wax present in said wax-containing gas stream is prevented from undergoing a phase change, and remains in the vapor phase. The wax-containing gas stream is then directed to the cooling zone of the first train, which is reduced to a second temperature, wherein substantially all of the wax present in said wax-containing gas stream is solidified onto the surface of the third heat exchanger.

This third heat exchanger has a detection device, which detects either a change in the temperature between the inlet and outlet of the third heat exchanger, or a change in pressure drop experienced by the gas-containing gas as it passes by the heat exchanger. Should this detection device indicate that the surface of the third heat exchanger is sufficiently covered with solidified wax, the wax-containing gas will be directed to the heating zone of the second train. The cooling zone of the first train will be increased to a third temperature, wherein substantially all of the wax present on the surface of said fourth heat exchanger is melted. This melted wax will then be collected. The step of melting the frozen wax in the first cooling zone, will occur approximately concurrently to the operation of the second train as described above for the first train.

In another aspect of the present invention, an apparatus for separating is provided. The apparatus of separating includes an inlet conduit, and a first heating zone fluidly connected to the inlet conduit. This apparatus further includes a first cooling zone that is fluidly connected to the first heating zone. The apparatus further includes an outlet conduit that is fluidly connected to the first cooling zone.

In another aspect of the present invention, either the first heating zone or the second heating zone may contain heat exchangers.

In another aspect of the present invention, an apparatus for separating is provided. The apparatus of separating includes a common inlet conduit, and first and second heating zones fluidly connected to the inlet conduit. A first cooling zone is fluidly connected to the first heating zone, and a second coloing zone is fluidly connected to the second heating zone. A common outlet conduit is fluidly connected to both the first and second cooling zones.

In another aspect of the present invention, either the first or second cooling zones, or the first or second heating zones may contain heat exchangers.

In another aspect of the present invention, either the third or fourth heat exchangers may contain devices that can detect the presence of solidified wax on the surfaces of these heat exchangers.

BRIEF DESCRIPTION OF THE DRAWINGS

The invention may be understood by reference to the following description taken in conjunction with the accompanying drawings, and in which.

DETAILED DESCRIPTION OF SPECIFIC EMBODIMENTS

Figure 1:
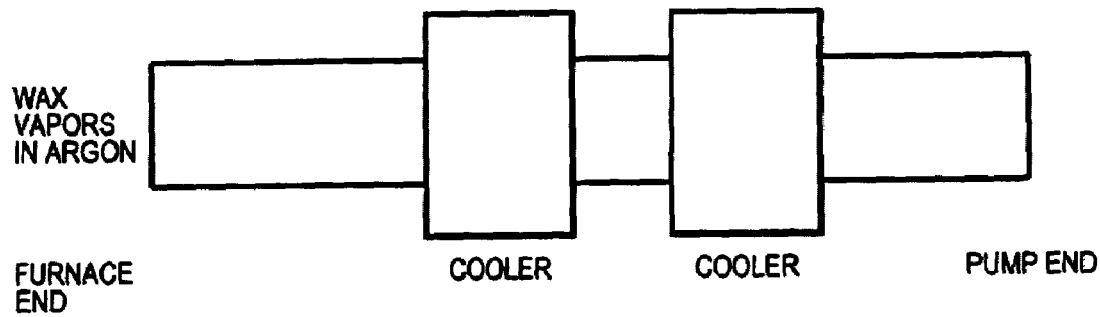
FIG. 1 is a schematic of one prior art approach for removing wax from a gas stream.
Figure 2:
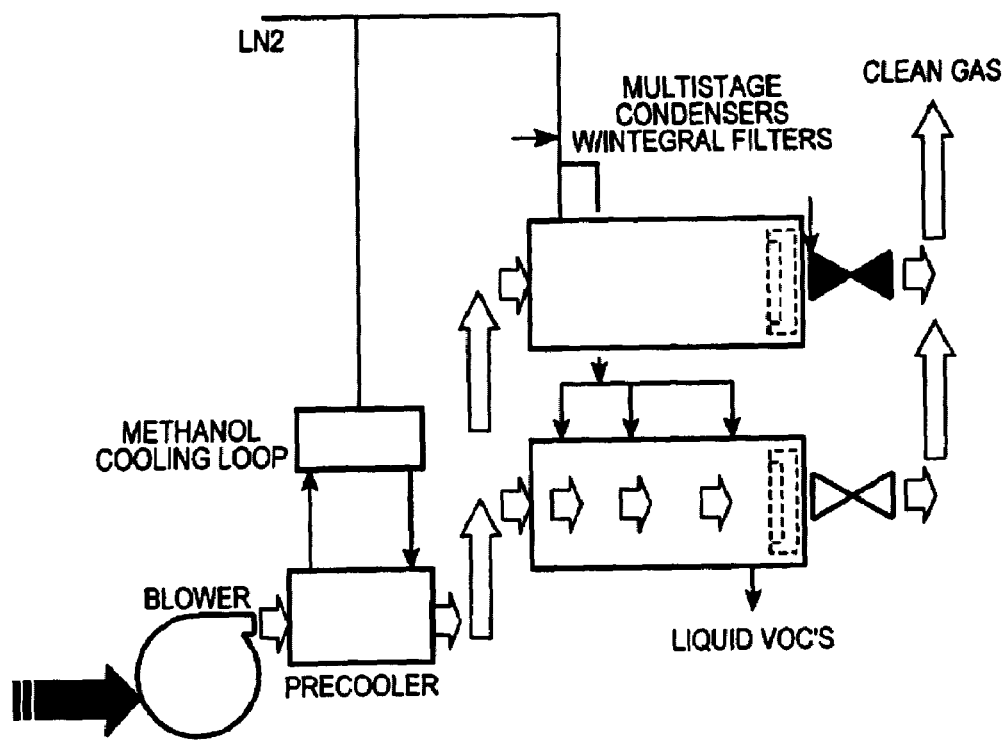
FIG. 2 is a schematic of another prior art approach for removing VOC from a gas stream.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The invention treats the effluent gas, typically high molecular waxy compounds in the vapor state carried by non-condensable air, nitrogen or argon gas, in order to remove the organic material. The invention uses both heating & cooling, at specified zones, to remove the waxy solids, by precipitation, from a gas stream without allowing unwanted buildup on the piping or severely restricting the traps themselves. This may be achieved by heating and insulating the feed and interconnecting piping between the traps, so as to keep the wax as a vapor until it can be precipitated out exclusively on the chilled trap surfaces. The trap surfaces can be extended fin tube heat exchangers that are cooled with liquid nitrogen, Freon or even very cold water. The use of extended fin tubing as the trap heat exchanger facilitates cooling and maximizes removal efficiency. The cooling agent flow rate, and resultant exit gas temperature, may be governed by a flow control valve driven by a single loop controller. Process modeling has shown that a gas exit temperature of about 0° F. to about 40° F. is a good range to efficiently remove most waxy solids. The cleaned air, $N_2$ or Ar gas then exits the system.

For purposes of this application, "substantially" means at least 50%, preferably at least 70%, and most preferably, at least 80%.

When the trap becomes substantially covered with waxy solids, or at the end of the heat treatment run in the furnace, the trap may be switched to a fresh condenser or train. This will allow the dirty trap to be cleaned in-situ via heating using a hot gas, in particular hot $N_2$ gas. The hot gas may be purged through the heat exchanger tubes and/or through the shell of the heat exchanger vessel, in order to facilitate the cleaning effort. The purge gas, which is warmed by an external heating device, can flow through the dirty trap until the exit temperature reaches a pre-set level that is greater than the melting point of the waxy solids. This may be achieved by using a single loop controller or temperature switch to drive a flow control valve in the hot gas line. The valve in the process gas line after the dirty trap may be closed during this operation, thereby forcing the warm cleaning gas through the still active trap. The control valve for the liquid $N_2$, or other cooling agent, may also be closed during this trap regeneration step.

As the wax melts off the surfaces of the dirty condenser, it runs down into the plenum for short-term storage. Heat tracing and insulation maintain the wax at a temperature above the melting point for easy removal through a draining device, in particular a valve. The wax can then be safely discarded without removing the trap internals or cleaning out the insides of process piping.

Figure 3:
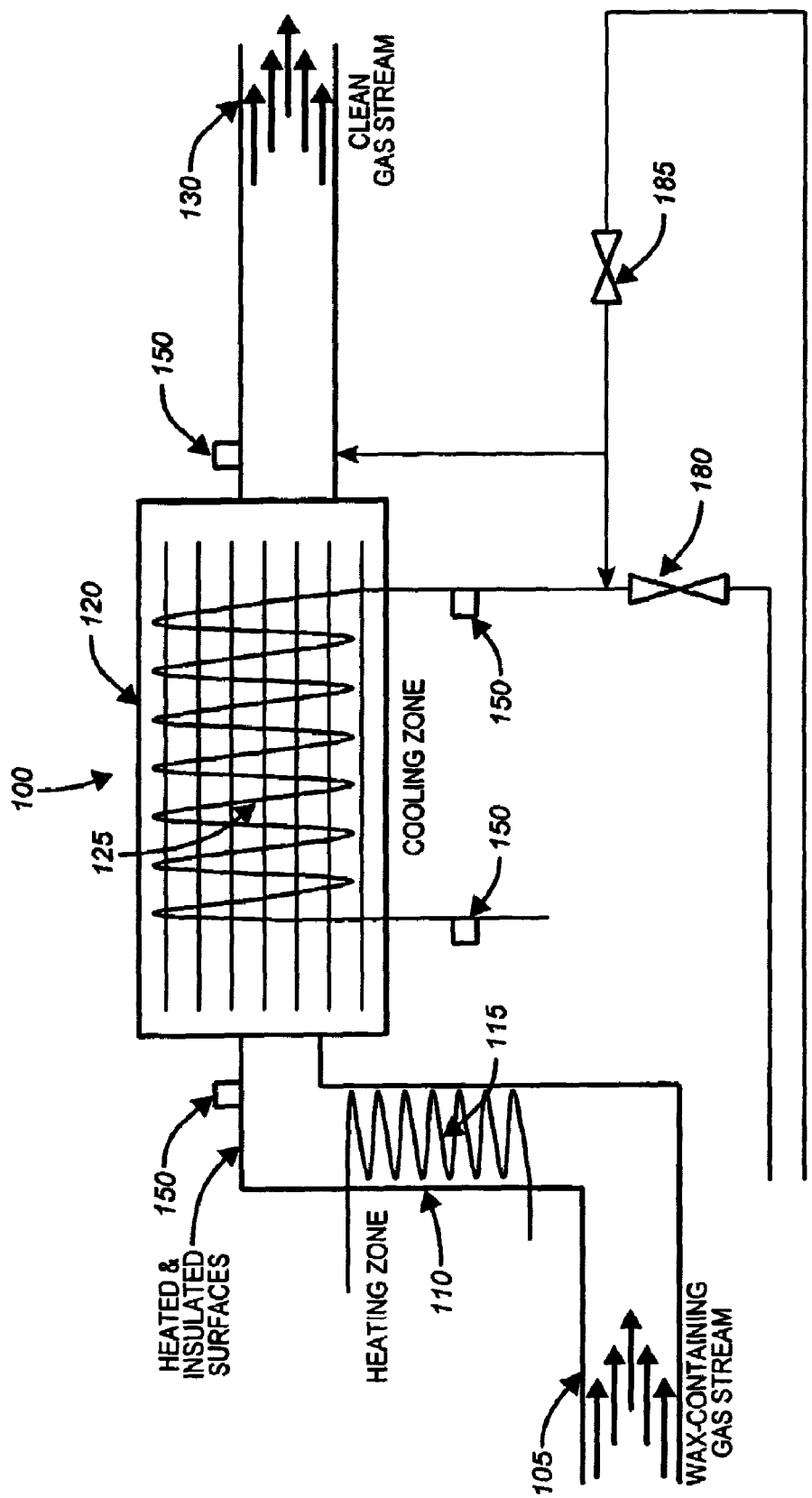
FIG. 3 is a schematic of a separation method and apparatus in accordance with one illustrative embodiment of the present invention.

Turning now to FIG. 3, a method and apparatus for separation 100 in accordance with the embodiments of the present invention is illustrated. The separator 100 comprises an inlet conduit 105, a heating zone 110, a cooling zone 120, and an outlet conduit 130. The heating zone may contain a first heat exchanger 115. The cooling zone may contain a second heat exchanger 125. The cooling zone may contain a detection device 150, on either the shell side to detect an increase in the pressure drop in the gas stream, or on the tube side to detect a decrease in the temperature drop in the cooling fluid.

The first heat exchanger or the second heat exchanger may be constructed, in whole or in part, of stainless steel. The first heat exchanger or the second heat exchanger may be of a counter-current design. The first heat exchanger or the second heat exchanger may be comprised of, in whole or in part, of extended fin tubing.

In one embodiment of the present invention, an impurity-containing fluid stream is introduced into the inlet conduit 105 of the heating zone 110. The impurities may be a wax, preferably a high molecular weight hydrocarbon, more preferably C12 or higher. The fluid stream may consist of non-condensable air, nitrogen or argon, preferably argon.

The temperature of the heating zone 110 is elevated to a first temperature $T_1$, which is sufficient to ensure that substantially all of the impurities within the fluid stream are prevented from undergoing a phase change, and remain in the vapor phase. The first temperature $T_1$ may be between about 150° F. and about 300° F., preferably between about 200° F. and about 250° F., and more preferably about 250° F. The impurity-containing fluid stream is then introduced into the cooling zone 120. The temperature of the cooling zone 120 is reduced to a second temperature $T_2$, which is sufficient to ensure that substantially all of the impurities in the fluid stream undergo a first phase change and is a function of the type of fluid used in cooling zone 120. Therefore, the second temperature may be as low as −350° F. and as high as 100° F. When a cryogenic liquid is used as the fluid, the second temperature $T_2$ may be between about −351° F. and about −260° F., preferably between about −330° F. and about −300° F., more preferably between about −321° F. to −300° F., and most preferably between about −303° F. to about −297° F. When the fluid is not a cryogenic liquid, the second temperature $T_2$ may be between about −40° F. and about 100° F., preferably between about 0° F. and about 40° F., and more preferably about 32° F. This first phase change can be either freezing, condensing or sublimation, preferably entering into the solid phase. The second temperature $T_2$ may be achieved by circulating a first fluid through the second heat exchanger 125. This first fluid may be a cryogenic liquid, such as liquid air, liquid nitrogen, liquid oxygen or liquid argon. The first fluid may also be a liquid with a temperature below ambient temperature, such as Freon, water or gaseous air. As used herein, ambient temperature is defined as being between about 0° F. and about 100° F.

As the impurities undergo the second phase change, they precipitate out of the impurity-containing fluid stream. These precipitated impurities will attach themselves to the inner surface of the cooling zone 120, preferably to the coils of the second heat exchanger 125. The fluid stream, now substantially free of these impurities, exits the cooling zone through the outlet conduit 130.

The degree of impurity coverage in the cooling zone 120 is continuously monitored, either by detection device 150, on either the shell side to detect an increase in the pressure drop in the gas stream, or on the tube side to detect a decrease in the temperature drop in the cooling fluid, or by any other means known to those of ordinary skill in the art. Once the cooling zone 120 is substantially covered with impurities, a second fluid may be directed through the second heat exchanger 125, in order to raise the cooling zone to a third temperature $T_3$, in order to melt the frozen impurities off of the surface. The third temperature $T_3$ may be between about 150° F. and about 300° F., preferably between about 200° F. and about 250° F., and more preferably about 200° F. The impurities that have been melted from the cooling zone may be collected and either used in some subsequent process, or disposed of.

Figure 4:
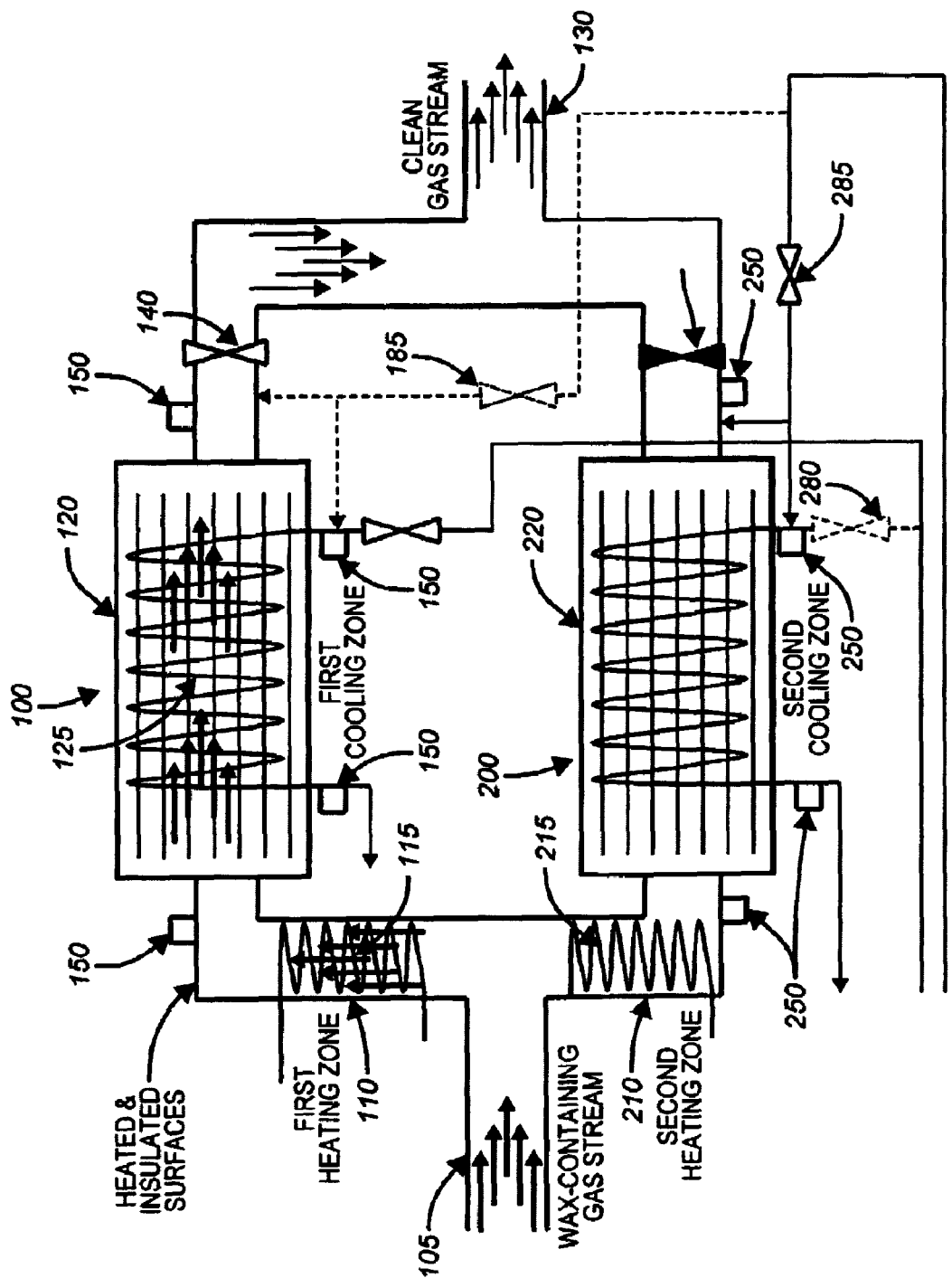
FIG. 4 is a schematic of a separation method and apparatus in accordance with one illustrative embodiment of the present invention.

Turning now to FIG. 4, a method and apparatus for separation 100/200 in accordance with the embodiments of the present invention is illustrated. The separator comprises at least two discrete trains 100 and 200.

The first train 100 comprises a common inlet conduit 105, a first heating zone 110, a first cooling zone 120, and a common outlet conduit 130. The first heating zone may contain a first heat exchanger 115. The cooling zone may contain a third heat exchanger 125. The cooling zone may contain a detection device 150, on either the shell side to detect an increase in the pressure drop in the gas stream, or on the tube side to detect a decrease in the temperature drop in the cooling fluid.

The second train 200 comprises a common inlet conduit 105, a heating zone 210, a cooling zone 220, and a common outlet conduit 130. The heating zone may contain a second heat exchanger 215. The cooling zone may contain a fourth heat exchanger 225. The cooling zone may contain a detection device 250, on either the shell side to detect an increase in the pressure drop in the gas stream, or on the tube side to detect a decrease in the temperature drop in the cooling fluid.

As required, additional trains may be incorporated into this design, and such an incorporation would be a routine undertaking for one of ordinary skill in the art.

In one embodiment of the present invention, an impurity-containing fluid stream is introduced into the inlet conduit 105 of the heating zone 110. The impurities may be a wax, preferably a high molecular weight hydrocarbon, more preferably C12 or higher. The fluid stream may consist of non-condensable air, nitrogen or argon, preferably argon.

The separator may be a duplex system, which would allow one train to be active, and separating impurities from the impurity-laden fluid stream, as described above with regard to FIG. 3, while the other train will be inactive, and melting the frozen impurities off the cooling zone. The detectors 150/250 may indicate that one heat exchanger is substantially covered with frozen impurities. The gas block valves, 140 for the first train and 240 for the second train, may then open or close as required to re-direct the impurity-laden fluid stream to be introduced into the active train. The cooling fluid block valves, 180 for the first train and 280 for the second train, may then open or close as required to re-direct the cooling fluid to the active train cooling zone. The heating fluid block valves, 185 for the first train and 285 for the second train, may then open or close as required to re-direct the heating fluid to the inactive train. The control for the gas block valves 140/240, cooling fluid block valves 180/280 and/or heating fluid block valves 185/285 can be manual, controlled locally by a Programmable Logic Controller (PLC), or controlled centrally by a Distributive Control Center (DCC).

What is claimed is:

1. A method of separating wax from a wax-containing feedstock comprising the steps of:
   a) introducing a wax-containing gas stream into a heating zone, wherein said heating zone contains a first heat exchanger,
   b) elevating said heating zone to a first temperature, wherein substantially all of the wax present in said wax-containing gas stream is prevented from undergoing a phase change,
   c) introducing said wax-containing gas stream into a cooling zone, wherein said cooling zone contains a second heat exchanger, and
   d) reducing said cooling zone to a second temperature, wherein substantially all of the wax present in said wax-containing gas stream is solidified onto the surface of said second heat exchanger,
      wherein said wax consists of a high molecular weight hydrocarbon consisting of $C_{12}$ and higher.

2. A method of separating wax from a wax-containing feedstock comprising the steps of:
   a) introducing a wax-containing gas stream into a heating zone, wherein said heating zone contains a first heat exchanger,
   b) elevating said heating zone to a first temperature, wherein substantially all of the wax present in said wax-containing gas stream is prevented from undergoing a phase change,
   c) introducing said wax-containing gas stream into a cooling zone, wherein said cooling zone contains a second heat exchanger, and
   e) reducing said cooling zone to a second temperature, wherein substantially all of the wax present in said wax-containing gas stream is solidified onto the surface of said second heat exchanger,
      wherein said wax-containing gas stream consists primarily of non-condensable air, nitrogen or argon.

3. A method of separating wax from a waxy gas stream comprising the steps of:
   a) introducing a wax-containing gas stream into a system comprising at least a first heating zone, a second heating zone, a first cooling zone, and a second cooling zone, wherein said first heating zone contains a first heat exchanger, said second heating zone contains a second heat exchanger, said first cooling zone contains a third heat exchanger, and said second cooling zone contains a fourth heat exchanger,
   b) directing said wax-containing gas stream to said first heating zone,
   c) elevating said first heating zone to a first temperature, wherein substantially all of the wax present in said wax-containing gas stream is prevented from undergoing a phase change,
   d) directing said wax-containing gas stream to said first cooling zone,
   e) reducing said first cooling zone to a second temperature, wherein substantially all of the wax present in said wax-containing gas stream is solidified onto the surface of said third heat exchanger, and
   f) increasing said second cooling zone to a third temperature, wherein substantially all of the wax present on the surface of said fourth heat exchanger is melted.

4. The method of claim 3, further comprising the step of:
   a) collecting said melted wax.

5. The method of claim 3, wherein steps e) and f) occur approximately concurrently.

6. The method of claim 3, wherein said first cooling zone and said second cooling zone further comprises at least one device for detecting the presence of said solidified wax on at least one of said third heat exchanger or said fourth heat exchanger.

7. The method of claim 6, wherein said detection device monitors the pressure drop experienced by said wax-containing gas as it passes through at least one of said first cooling zone or said second cooling zone.

8. The method of claim 6, wherein at least one of said first heat exchanger or said second heat exchanger further comprises an inlet and an outlet, and wherein said detection device monitors the change in temperature between said inlet and outlet experienced in at least one of said first heat exchanger or said second heat exchanger.

9. The method of claim 6, further comprising the steps of:
   a) monitoring said detection device on said third heat exchanger and said fourth heat exchanger,
   b) determining if either said third heat exchanger or said fourth heat exchanger is substantially covered with said solidified wax,
   c) directing said wax-containing gas stream into either said first heating zone, if said fourth heat exchanger is substantially covered with said solidified wax, or to said second heating zone, if said third heat exchanger is substantially covered with said solidified wax, and d) regenerating, either said second cooling zone, wherein substantially all of the wax present on the surface of said third heat exchanger is melted, if said wax-containing gas stream is directed into said first heating zone, or said first cooling zone, by increasing either said first cooling zone or said second cooling zone to a third temperature wherein substantially all of the wax present on the surface of said fourth heat exchanger is melted, if said wax-containing gas stream is directed into said second heating zone.

* * * * *